United States Patent [19]

Yamaguchi et al.

[11] Patent Number: 5,003,458
[45] Date of Patent: Mar. 26, 1991

[54] SUSPENDED INSTRUCTION RESTART PROCESSING SYSTEM BASED ON A CHECKPOINT MICROPROGRAM ADDRESS

[75] Inventors: Shinichiro Yamaguchi; Hidekazu Matsumoto, both of Hitachi; Tadaaki Bandoh, Ibaraki; Hirokazu Hirayama, Hitachi; Takayuki Morioka, Hitachi; Soichi Takaya, Hitachi; Yukio Kawamoto, Hitachi; Jushi Ide, Mito; Yoshihiro Miyazaki, Hitachi, all of Japan

[73] Assignee: Hitachi, Ltd., Tokyo, Japan

[21] Appl. No.: 111,618

[22] Filed: Oct. 23, 1987

[30] Foreign Application Priority Data

Oct. 24, 1986 [JP] Japan ................ 61-251760
Feb. 4, 1987 [JP] Japan ................ 62-22347

[51] Int. Cl.[5] .................. G06F 9/40; G06F 9/42; G06F 11/28; G06F 12/16
[52] U.S. Cl. .................. 364/200; 364/265.6; 364/266.5; 364/267.6; 364/285.2; 364/266.1; 364/265.6; 364/247.6; 364/247.8; 364/267.3; 364/268; 364/254; 364/256.3; 364/945; 364/945.7; 364/945.9; 364/944.6; 364/945.1; 364/933.5; 364/932.62; 364/940.91; 364/945.3; 364/948.34; 364/957.1; 364/961.2
[58] Field of Search ................ 364/200, 900

[56] References Cited

U.S. PATENT DOCUMENTS

| | | | |
|---|---|---|---|
| 4,458,307 | 7/1984 | McAnlis et al. | 364/200 |
| 4,483,228 | 12/1984 | Crudelo et al. | 364/200 |
| 4,491,912 | 1/1985 | Kainaga et al. | 364/200 |
| 4,524,415 | 6/1985 | Mills, Jr. et al. | 364/200 |

OTHER PUBLICATIONS

J. Mick et al., "Microprogramming a Bipolar Microprocessor", Advanced Micro Devices, Inc., Microprog. Handbook, 1976, pp. 1—1 to 1-12.

Primary Examiner—Archie E. Williams, Jr.
Assistant Examiner—Ayni Mohamed
Attorney, Agent, or Firm—Antonelli, Terry, Stout & Kraus

[57] ABSTRACT

Method and apparatus for instruction restart processing in a microprogram-controlled data processing apparatus, wherein, in restarting an instruction execution after instruction suspension, the internal information of the data processing apparatus at the time of instruction execution suspension is saved in a memory, and after a suspension cause removal process performed the saved internal information is recovered. A check point address associated with the address of a currently executing microprogram is stored in accordance with a designation by the microprogram. After a suspension causes removal process is performed, the execution of the instruction restarts using the check point address. If a check point address has not been stored after the suspension cause removal process is performed, the execution of the instruction restarts from a read operation of the suspended instruction from the main storage.

3 Claims, 6 Drawing Sheets

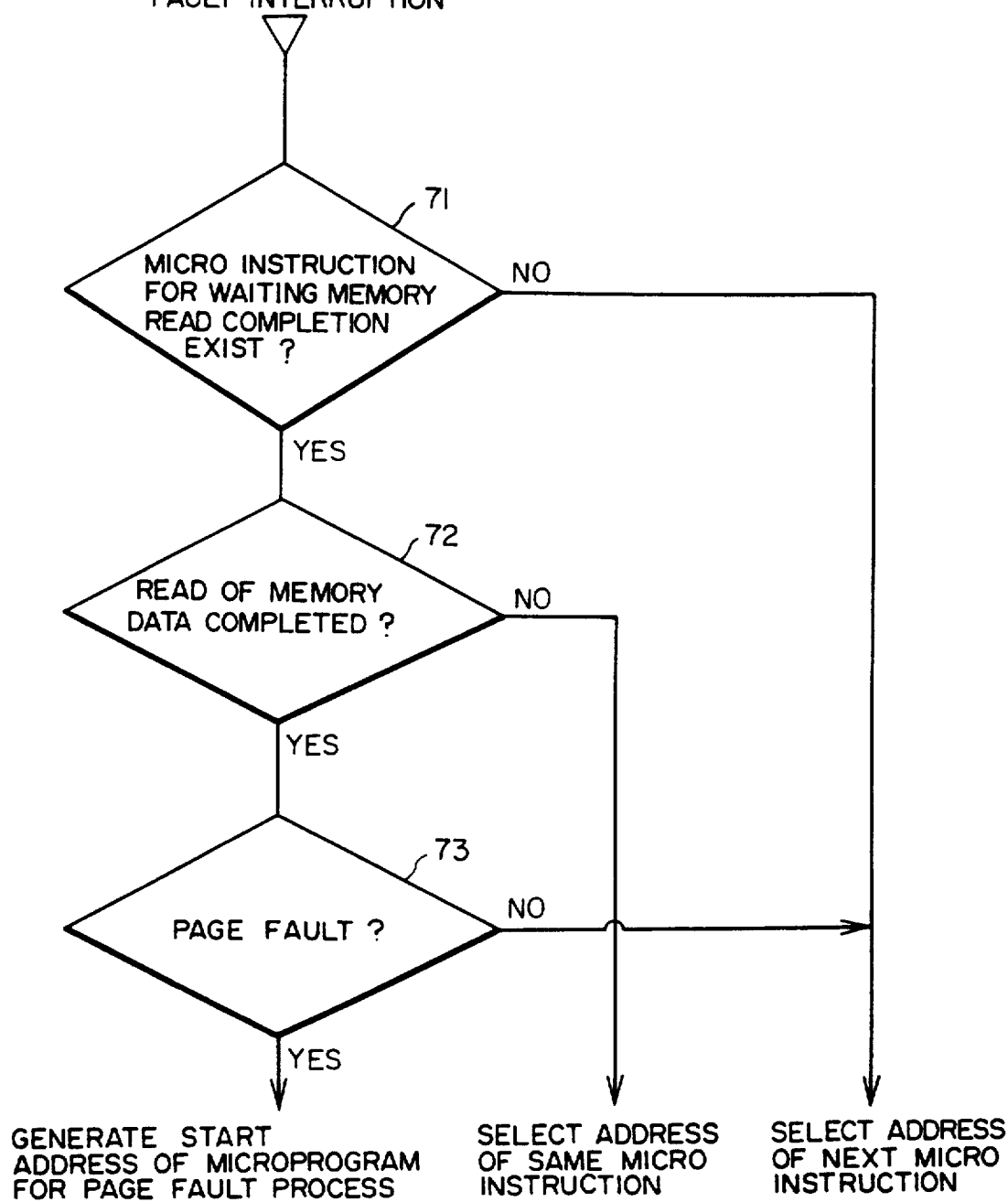

SUSPENDED INSTRUCTION RESTART PROCESSING SYSTEM BASED ON A CHECKPOINT MICROPROGRAM ADDRESS

BACKGROUND OF THE INVENTION

The present invention relates to an instruction restart processing method and apparatus for a microprogram-controlled data processing apparatus.

In a conventional recovery method, it is common to re-execute an instruction from its start when an intermittent malfunction of a processor occurs. According to such instruction re-execution, as disclosed in Japanese Patent Examined Publication No. 47-48614, the content of a register or a storage which could be destroyed by an instruction to be executed is saved. When a malfunction is detected, the content is returned to the register from the storage to re-execute the instruction from its start. However, as an instruction becomes sophisticated, the amount of information, be saved increases to thereby resulting in a lowering of the processing speed.

Apart from the above, as the system architecture becomes high grade, in addition to a processor malfunction, a missing page fault or the like may appear as a reason for suspending the execution of an instruction, the missing page fault occurring is inevitably due to insufficient virtual storage capacity. In this case, re-execution of a sophisticated instruction is also difficult. To solve this problem, a method of restarting an instruction at its midway point has been proposed. According to the instruction midway restart method or the method for restarting an instruction from an intermediate point, is disclosed in U.S. Pat. No. 4,488,228 and Japanese Patent Unexamined Publication No. 53-84540, when an instruction suspension occurs, the content of a register or storage at that time is saved so that the saved information may be recovered at the restart time to re-execute the processing. The instruction midway restart method, however, poses a problem coping with a large amount of saved information at the suspension time. Specifically, in case of a pipelining data processing apparatus, it is necessary to save control information of plural units so that large scale hardware is required and a long time is required for saving and recovery of the information. Thus, a conventional instruction midway restart method poses a problem of handling a large amount of saved information for use in restarting the instruction.

SUMMARY OF THE INVENTION

It is a first object of the present invention to provide an instruction restart processing method and apparatus which requires the saving of only a small amount of information at the time of an instruction suspension, such as an intermittent malfunction, a missing page fault or the like.

It is a second object of the present invention to provide an instruction restart processing method whereby an instruction restart after a page fault process can be conducted based on a check point microprogram address (hereinafter called a check point address).

The first object is achieved by the provision of hardware capable of setting a restart point by using a microprogram (micro instructions). Namely, there are provided a saving register for saving a restart address of a control storage which stores a microprogram. A restart point is written in the saving register in accordance with a designation provided by a micro instruction, a restart point valid flag is set indicating that a restart point has been written in the saving register. The content of the restart point valid flag is then determined in accordance with the micro instruction, and the hardware operates for re-executing the process from the restart point written in the saving register. When a suspended instruction is caused to restart, the instruction does not start from the suspended point. Rather by judging the content of the restart point valid flag, the process is re-executed from the restart point in the saving register in case the flag has been set, and in case it has not been set, the process is re-executed from an instruction fetch of the suspended instruction.

Since the restart point is designated by a microprogram, it can be set at a step capable of restarting. In case that it becomes impossible to restart (in case there is a renewal of a register which serves as a source after the restart point), the next restart point can be set. Thus, a correct restart can be executed by previously setting a proper restart point, providing a flag indicating whether a restart point has been set, and judging the flag in accordance with a micro instruction.

The second object is achieved by the provision of a first register for storing a check point address, that is, a restart point address, whereby in order to effect an instruction midway of restart, the content of the first register saved in a memory is used as a microprogram address.

BRIEF DESCRIPTION OF THE DRAWINGS

FIG. 7 is a flow chart illustrating the operation of the circuits shown in FIG. 1.

DESCRIPTION OF THE PREFERRED EMBODIMENT

Figure 2:
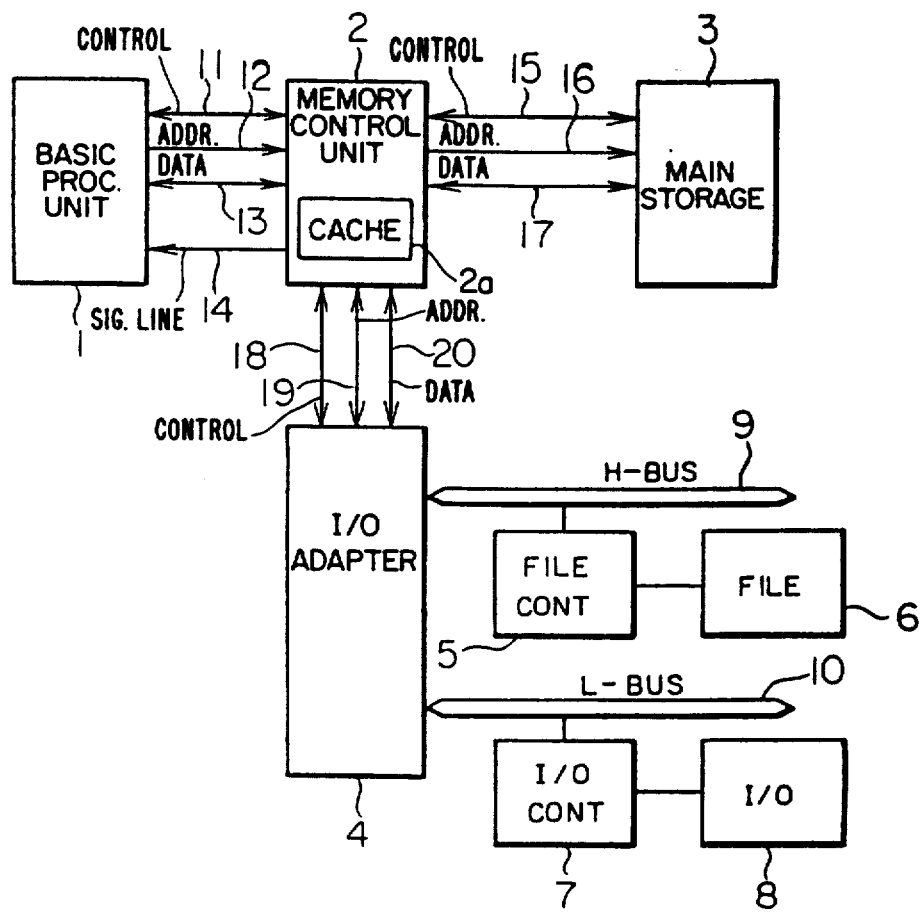
FIG. 2 is a block diagram showing the system architecture according to this invention.

FIG. 2 shows an example of a system architecture of the present invention, which comprises a basic processing unit BPU 1 for executing an instruction, a memory 2a control unit MCU 2 with a cache memory for performing address translation and memory control, a main storage MS 3 for storing instructions and data, and an I/O adapter I/O ADPT 4 for controlling a high speed bus H-BUS 9 and a low speed bus L-BUS 10.

The operation of the system will be described below.

BPU 1 accesses MCU 2 via a control bus 11, a logical address bus 12 and a data bus 13. MCU 2 translates a logical address into a physical address, and if there is data corresponding to the physical address in the cache memory 2a included therein (hereinafter abbreviated as cache), the data is transferred to BPU 1 via the data bus 13. If not present in the cache 2a, MCU 2 accesses MS 3 via a control bus 15, a physical address bus 16 and a data bus 17. If there is not a page in MS 3 at a physical address by MCU 2, it informs BPU 1 of a missing page fault via a signal line 14.

I/O ADPT 4 arbitrates between transfer requests from H-BUS 9 and L-BUS 10 for the access to MCU 2 via a control bus 18, a physical address bus 19 and a data bus 20. H-BUS 9 is connected mainly to high speed devices such as a file unit 6. In this embodiment, a file controller 5 connected to H-BUS 9 controls the file unit 6 and performs DMA transfer. An I/O controller 7 is connected to L-BUS 10 to control an I/O unit 8 and perform DMA transfer.

Figure 3:
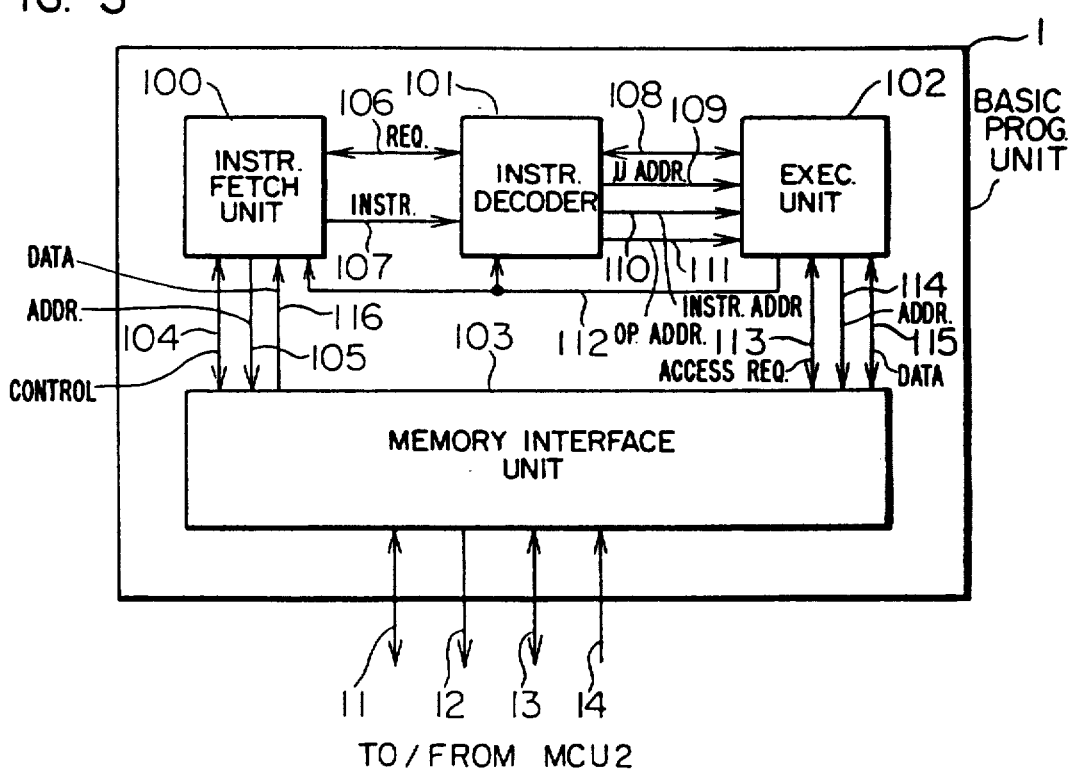
FIG. 3 is a block diagram showing the internal arrangement of the data processing apparatus according to the invention.

FIG. 3 shows the internal structure of BPU 1.

An instruction fetch unit IF 100 is a unit for fetching an instruction in advance. IF 100 stores a fetched instruction in its internal buffer and gives it to a decode and address translation unit DA 101 every time an instruction request from DA 101 is received via a signal line 106. DA 101 decodes an instruction from IF 100 to thereby generate an address of a microprogram corresponding to the instruction in an execution unit E 102 and gives it to E 102 via a signal line 109. DA 101 gives the address of the microprogram and an address of the instruction to E 102 via a signal line 110. DA 101 also calculates the effective address of an operand of the instruction and gives it to E 102 via a signal line 111. E 102 is a unit for executing an instruction by way of a microprogram control method. E 102 executes an instruction based on the address of a microprogram and the effective address of an operand received from DA 101. When reading operand, E 102 requests an access to an MINF 103 via a control bus 113, a logical address bus 114, and a data bus 115. When an instruction is fetched, IF 100 sends an instruction read access request to MINF 103 via a control bus 104, a logical address bus 105, and a data bus 116. MINF 103 arbitrates between access requests from IF 100 and E 102 for conducting an access request to MCU 2.

DA 101 and E 102 are pipelined to each other in a unit of an operand. When a plurality of address calculations are performed by DA 101, DA 101 and E 102 process the same instruction. An address signal line 112 designates an instruction after initialization to IF 100 and DA 101.

Figure 1:
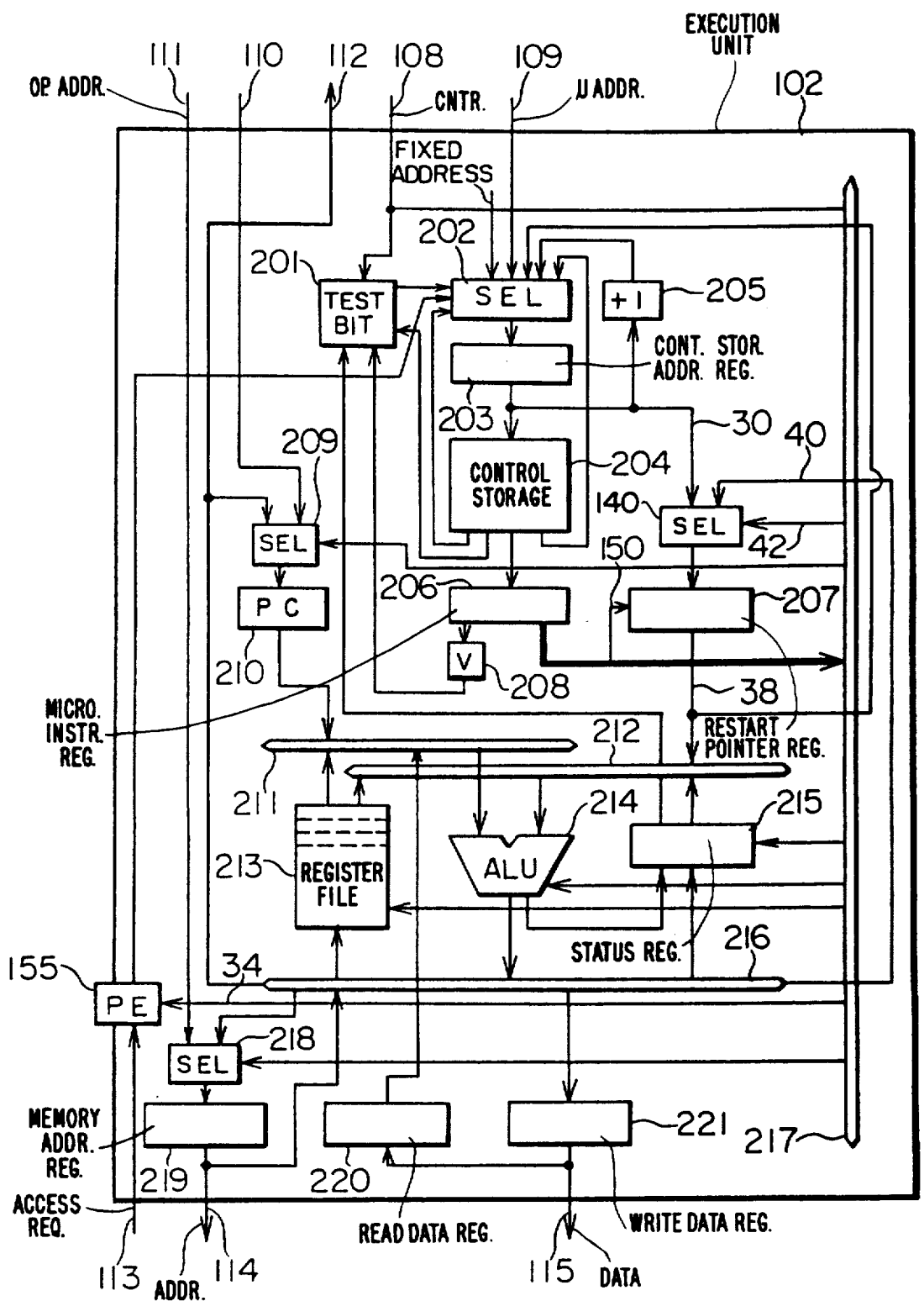
FIG. 1 is a block diagram showing the hardware structure according to this invention.

FIG. 1 shows the internal arrangement of E 102. A micro address selector SEL 202 selects the micro address of the next micro instruction to be executed. The inputs to SEL 202 include the start address of a microprogram received from DA 101 via the signal line 109, the currently executed microprogram address incremented by one as received from an incrementer 205, a branch microinstruction address from a control storage CS 204, a fixed address of an exception process, a check point microprogram address from RPR 207 via the signal line 38, and the like. A micro address selected by SEL 202 is sent to a control storage address register CSAR 203, and is supplied to CS 204. CS 204 is a control storage for storing a microprogram constructed of 64 bits × 8 K steps. The content of CS 204 at the applied address is outputted during each machine cycle of BPU 1 and includes a microinstruction which is sent to and stored in a micro instruction register MIR 206. The read-out content of CS 204 is sent to the internal hardware of BPU 1 via MIR 206 an internal control bus 217 for performing reading from and writing to a register, controlling calculation units, and so on. SEL 202 is controlled by a branch designation signal from CS 204, an output of PE 155 to initiate error processing and a test bit circuit 201. The test bit circuit 201 performs conditions judgement in accordance with a micro instruction and an output signal from CS 204, to thereby control SEL 202. The input signals to the test bit circuit 201 include a ready signal for a micro address (signal 109) and a ready signal for an effective address (signal 111), both signals being transferred in response to a signal on the control line 108, a calculation result status signal from a status register 215, an access response signal to MCU 2 transferred via the signal line 113, a signal indicating that saving the content of CSAR 203 has been executed by a current instruction and a valid restart address (check point address) has been set in a restart pointer register 207, and other signals. The test bit circuit 201 is controlled such that SEL 202 selects the fixed address in the case where the cause of suspending an instruction, such as a page fault, is included in an access response transferred via the signal line 113 to PE 155. RPR 207 is a register for saving the address of CSAR 203 by a designation of a micro instruction (a write signal is outputted from an MIR 206). If a write operation to this register is performed, a bit V 208 which is used to indicate such an effect is set. The calculation section of E 102 is constructed of source buses 211 and 212, a register file 213, an ALU 214, a status register 215, and a destination bus 216. The register file 213 is constructed of eight general-purpose registers, eight work registers and a stack pointer, which are selected by an output control signal on bus 217 from MIR 206 for reading and writing. ALU 214 executes a calculation of data from the source buses 211 and 212, and the calculated result is outputted to the destination bus 216 and the status of the calculated result is stored in the status register SR 215. A selector SEL 218 selects one of the effective address received from DA 101 via the signal line 111 and the data on the destination bus 216, and outputs a selected one to a memory address register MAR 219. MAR 219 sends a memory access address to MINF 103 via the signal line 114.

A read data register RDR 220 receives data from MINF via the signal line 115 and outputs it to the source bus 211. A write data register WDR 221 receives data on the destination bus 216 and sends it to MINF 102 via the signal line 115. A program counter 210 stores an MS 3 address of an instruction currently executed by E 102, the address being given from a selector SEL 209. SEL 209 selects one of an instruction address given from DA 101 via the signal line 110 and an input from the destination bus 216, and the selected one is outputted to PC 210. The signal line 112 is used for giving the next instruction execution address to DA 101 and IF 100 at the initialization or at the execution of a branch instruction.

Figure 4:
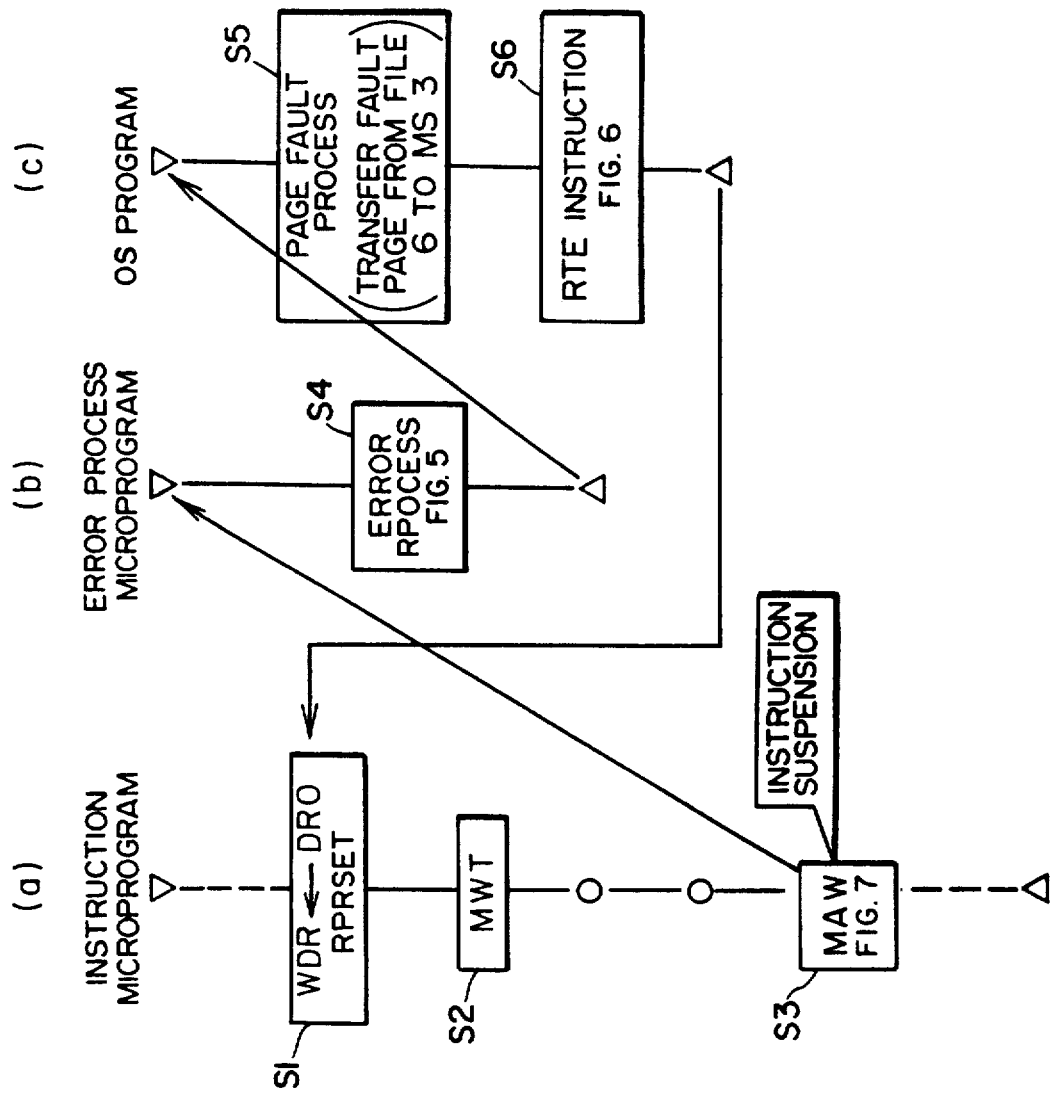
FIG. 4 is a schematic view illustrating an embodiment of the page fault process according to the invention.

FIG. 4 illustrates the processings of a microprogram, an error process microprogram, and an OS program, including occurrence of a missing page fault process.

FIG. 4(a) illustrates a flow of an instruction microprogram for writing data into a memory, one step corresponds to one micro instruction. "WDR←DR0" in step S1 indicates that the content of a general-purpose register DR0 in the register file 213 is loaded in WDR 221. "RPRSET" indicates that the control storage address in CSAR 203 is loaded into RPR 207 and then V 208 is set. "MWT" in step S2 indicates that a memory write access is actuated. "MAW" in step S3 indicates that a response to a write access actuation is waited for.

When MCU 2 detects a page fault, a page fault generation signal as well as a memory access completion signal are received via the signal line 113 and stored in a PE 155.

In the flow of the microprogram shown in FIG. 4, when the microprogram outputs a memory access completion wait MAW, a memory access wait is delivered to PE 155 via a signal line 34. This allows a page fault generation signal in PE 155 to initiate the error process microprogram of step S4.

FIG. 7 is a flow chart illustrating the detection of a page fault interruption by designation of a microprogram. The description is directed to the case where a memory access completion signal step 72 and a page fault interruption generation signal have been received step 73. In this case, when the microprogram outputs a memory access completion wait to the signal line 34 step 71, PE 155 outputs onto a signal line 36 at step 73 a signal instructing that SEL 202 selects the fixed address for the page fault process microprogram. If a normal completion response is returned, the flow does not jump to an error process, but jumps to the next steps 71 and 72.

Figure 5:
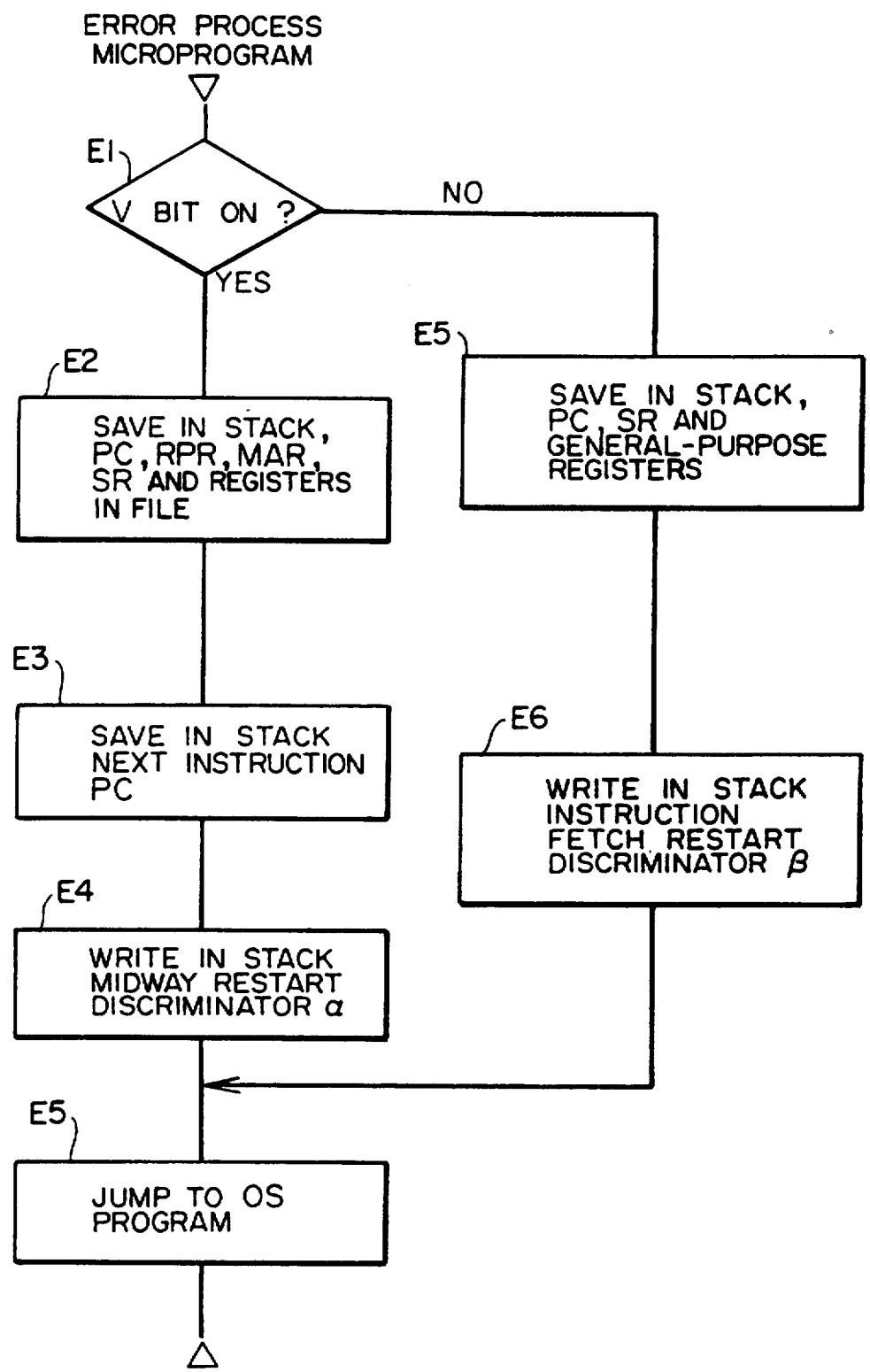
FIG. 5 is a flow chart showing the content of an error (page fault) process microprogram.

FIG. 5 shows the detailed content of the error process microprogram of step S4 in FIG. 4(b). At step E1 the test bit circuit 201 judges if V 208 is in an on-state. If it is in an on-state, the address from the incrementer 205 is selected by SEL 202 and the flow advances to step E2. The sequence including step E2 is for the instruction midway restart. If V 208 is not an on-state, a branch address outputted from CS 204 is selected by SEL 202 and the flow advances to step E6. The sequence including step E6 is for an instruction fetch restart.

First, the instruction midway restart will be described in detail. Step E2 is a step for saving the contents of the internal registers at that time. First, the content of SR 215 indicating the program execution status is saved to the memory region via ALU 214, WDR 221 and signal line 115.

Next, the content of RPR 207 storing therein a check point microprogram address is saved to the memory region via signal line 38, ALU 214, WDR 221 and signal line 115. Thereafter, the content of the internal registers 213 is saved in a similar manner. At step E3 the next instruction address is received from DA 101 via the signal line 110 and it is saved in the stack. At step E4 a discriminator α for performing a midway restart is written in the stack.

Next, the instruction fetch restart will be described. Step E6 indicates that the contents of the internal registers necessary for the instruction fetch restart are saved. Step E7 indicates that a discriminator β for performing an instruction fetch restart is written. Next, in step E5, the flow branches to a page fault process of the OS program.

Referring to FIG. 4(c), a page fault process is performed at step S5 wherein a page corresponding to the page fault is transferred from the file 6 to MS 3. After completion of the transfer, a return from exception RTE instruction is executed at step S6 to return to the original instruction.

Figure 6:
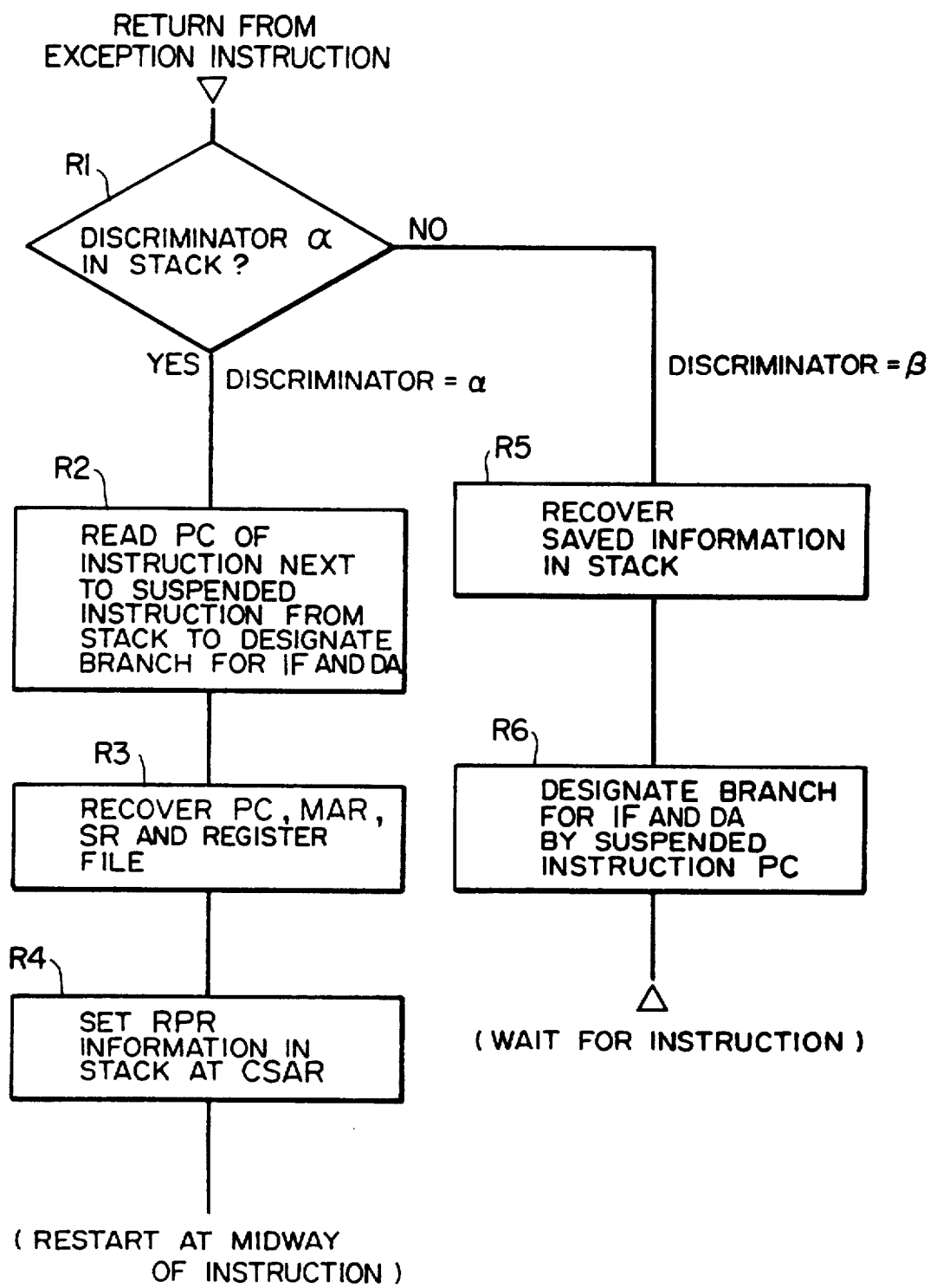
FIG. 6 is a flow chart showing the content of an RTE instruction.

FIG. 6 shows the detailed content of an RTE instruction. At step R1, it is checked if an instruction midway restart (discriminator=α) or an instruction fetch restart (discriminator=β) is selected based on a discriminator in the stack.

First, the operation of the instruction midway restart operation will be described. At step R2 the content of PC 210 for the next instruction is read from the stack to thereby instruct IF 100 and DA 101 to start the instruction execution from that instruction. At this time, the instruction address is given from E 102 via the signal line 112 to IF 100 and DA 101. Step R3 is a step for recovering the contents of the saved internal registers, wherein the contents of the saved registers except RPR are recovered. Step R4 is a step for setting the saved information of RPR in CSAR 203 and return to the restart point of the suspended instruction.

The recovery of the content of RPR 40 saved in the memory region, that is, the checkpoint microprogram address, to RPR 207 is executed by a microprogram which designates the recovery.

The microprogram which designates the recovery is read to MIR 206, and a signal line 42, which carries one of the control signals 217 becomes an ON state, and SEL 140 selects the signal line 40 as an input to RPR 207. On the signal line 40, there is the content of RPR 207 saved in the memory region, that is, the checkpoint microprogram address is carried thereon via the signal line 115, RDR 220, the source bus 211, ALU 214, and the destination bus 216. As a result, a desired checkpoint microprogram address can be recovered to RPR 207 by selecting the signal line 40 as an input to SEL 140.

Subsequently, based on a microprogram which designates to select the content of RPR 207 as a microprogram start address, SEL 202 selects a signal line 38 indicating the content of RPR 207 as the microprogram start address, and sends out the content of RPR 207 to CSAR 203.

Accordingly, restart of the instruction becomes possible by the checkpoint microprogram address which has been stored in RPR 207 before the occurrence of the page fault.

Further, in the aforementioned embodiment, the checkpoint and the actuation of memory can be designated independently. However, if it is possible to prepare a microprogram in such a way that the restart is effected by the microprogram which designates the memory actuation, the checkpoint can be set at the time of memory actuation. In this case, it is only required to store the microprogram address under execution in RPR 207.

Furthermore, in the above embodiment, in recovering the checkpoint address from the memory, the recovery is performed through RPR 207. However, the restart and execution of the instruction from the checkpoint address is also possible by providing a register separately from RPR 207 so that the checkpoint address is recovered to CSAR 203 through this register.

In addition, in the above embodiment, although the address which has designated the checkpoint is saved as a checkpoint address, there are some cases in which it is easier to save the address of a microprogram which is to be executed subsequently. In such a case, the microprogram which designates the checkpoint is made to be executed just prior to the microprogram which is to be restarted, and the checkpoint becomes the next address of the microprogram under execution.

Next, the operation of the instruction fetch restart will be described. Step R5 is for recovering the saved information, and step R6 is for re-executing the suspended instruction from the instruction fetched. The address of the suspended instruction is given to E 102, IF 100 and DA 101 via the signal line 112. Then, at step R6 E 102 waits for an instruction.

As seen from the foregoing description of the invention, it is possible to flexibly set a restart point different from the instruction suspended point. Thus, by setting the restart point at a proper step, the saved information by E 102 becomes minimum and it becomes unnecessary to save control information for the units performing a pre-process of an instruction executed by the instruction fetch unit IF 100 and the decode and address calculation unit DA 101.

Since the amount of the saved information at the occurrence of an instruction suspension is reduced, advantageously it becomes unnecessary to save control information for the units performing a pre-process, particularly in the case of a data processing apparatus performing pipelined processes of a plurality of units. Further, a large number of re-trying processes in the case of a sophisticated instruction can be realized without the need for large scaled hardware.

What is claimed is:

1. An apparatus for instruction restart processing in a microprogram controlled data processing apparatus of the type in which an instruction read from a main storage is executed in accordance with a microprogram, said instruction restart processing apparatus comprising:

first storage means for storing a read address of a control program storage which stores a microprogram;

means for causing said first storage means to store said read address of said control program storage in accordance with a designation by said microprogram;

second storage means for storing information indicating whether said read address is stored in said first storage means;

judgement means for checking the content of said second storage means in accordance with said microprogram; and means for restarting execution of said instruction by reading said microprogram stored at said read address stored in said first storage means;

wherein a predetermined microinstruction in said microprogram causes said read address to be stored in said first storage means; and wherein when a suspension of instruction execution of said instruction occurs while executing said instruction and said suspended instruction starts to be executed, the content of said second storage means is checked;

wherein in a case where storing of said read address has been performed, execution of said suspended instruction is restarted by reading said microprogram at said read address; and wherein in a case where storing of said read address has not been performed, execution of said suspended instruction is restarted by reading again said suspended instruction from said main storage.

2. A method for instruction restart processing in a microprogram controlled data processing apparatus of the type in which an instruction read from a main storage is executed in accordance with a microprogram, and said instruction being included within an instruction execution microprogram having a micro instruction for determining an address for reading a microprogram for restarting execution of the instruction after suspension of instruction execution, comprising the steps of:

checking to determine whether a read address of a restart microprogram has been saved or not, when suspension of instruction execution occurs while executing an instruction and checking to determine whether the cause of the suspension is removed thereafter;

reading said restart microprogram at a saved read address when a suspension of instruction execution occurs and starting execution of the suspended instruction, when said read address has been saved;

starting execution of said suspended instruction from a read operation of said suspended instruction from said main storage when said read address had not been saved;

providing a first unit for performing a preparation process for execution of an instruction by reading the instruction from a main storage; and providing a second unit for executing the instruction in accordance with a microprogram by again reading the instruction from the main storage;

wherein at least said first and second units are pipelined to each other;

wherein said second unit comprises first storage means for storing a read address related to an address of said microprogram at the time of executing said instruction, and second storage means for storing information indicating whether said read address has been stored;

wherein when a suspension of instruction execution occurs while executing said instruction and said suspension of instruction execution cause is removed thereafter, the content of said second storage means is checked; and wherein in a case where said read address has been stored, said suspended instruction starts to be executed by reading said microprogram at said read address, and said first unit is caused to start reading the next instruction after said suspended instruction from said main storage.

3. A method according to claim 2, wherein in case where said read address has not been stored, said first unit causes said second unit to start again reading said suspended instruction from said main storage.

* * * * *